(12) United States Patent
Videtto

(10) Patent No.: US 7,549,826 B2
(45) Date of Patent: Jun. 23, 2009

(54) DEVICE TO COLLECT CUTTINGS PRODUCED BY A CUTTING TOOL

(75) Inventor: Donald W. Videtto, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 378 days.

(21) Appl. No.: 11/164,565

(22) Filed: Nov. 29, 2005

(65) Prior Publication Data

US 2007/0122243 A1 May 31, 2007

(51) Int. Cl.
B23B 47/34 (2006.01)

(52) U.S. Cl. .................. 408/1 R; 408/67; 408/72 B; 408/202

(58) Field of Classification Search .............. 408/1 R, 408/67, 72 B, 97, 115 R, 115 B, 202, 203; 409/137

See application file for complete search history.

(56) References Cited

U.S. PATENT DOCUMENTS

| | | | | | |
|---|---|---|---|---|---|
| 1,612,205 | A | * | 12/1926 | Muth | 408/72 B |
| 1,617,554 | A | * | 2/1927 | Swartz | 408/241 R |
| 2,375,367 | A | * | 5/1945 | Johnson | 384/276 |
| 2,409,525 | A | * | 10/1946 | Andreasson | 408/59 |
| 2,548,314 | A | * | 4/1951 | Kinney, Sr. | 408/67 |
| 2,669,889 | A | * | 2/1954 | Hüller | 408/22 |
| 3,340,915 | A | * | 9/1967 | Passer | 408/72 R |
| 3,776,647 | A | * | 12/1973 | Hart | 408/241 G |
| 3,936,213 | A | * | 2/1976 | Kappel | 408/67 |
| 3,981,604 | A | * | 9/1976 | Cenis | 408/72 B |
| 4,209,069 | A |   | 6/1980 | Smith | |
| 4,251,171 | A | * | 2/1981 | Brett | 408/67 |
| 4,594,031 | A | * | 6/1986 | Tesmer | 408/72 B |
| 5,080,535 | A |   | 1/1992 | Hirano | |
| 5,087,158 | A |   | 2/1992 | Devine | |
| 5,108,241 | A | * | 4/1992 | Coss | 408/72 B |
| 5,160,230 | A | * | 11/1992 | Cuevas | 408/67 |
| 5,292,210 | A | * | 3/1994 | Nowick | 408/67 |
| 5,630,683 | A | * | 5/1997 | Smith | 408/67 |
| 5,653,561 | A | * | 8/1997 | May | 408/67 |
| 7,258,513 | B2 | * | 8/2007 | Gertner | 408/67 |

FOREIGN PATENT DOCUMENTS

| | | | | |
|---|---|---|---|---|
| DE | 1005009314 A1 | * | 8/2006 |
| GB | 2435438 A | * | 8/2007 |
| JP | 08019933 A | * | 1/1996 |
| JP | 08090322 A | * | 4/1996 |
| JP | 10006172 A | * | 1/1998 |
| JP | 11197920 A | * | 7/1999 |
| JP | 200179705 A | * | 3/2001 |
| JP | 2002126921 A | * | 5/2002 |
| JP | 2002126922 A | * | 5/2002 |
| KR | 2002050957 A | * | 6/2002 |
| SU | 1252073 A1 | * | 10/1984 |
| SU | 1154071 A | * | 5/1985 |

* cited by examiner

*Primary Examiner*—David P Bryant
*Assistant Examiner*—Eric A Gates
(74) *Attorney, Agent, or Firm*—Charles L. Moore; Moore & Van Allen, PLLC

(57) ABSTRACT

A device to collect cuttings produced by a cutting tool may include a chip cutter to shear each cutting into a multiplicity of chips each substantially smaller than each cutting. The device may also include a collector to collect the chips without using suction and other air or gas pressure. The chip cutter may be disposed within the collector.

23 Claims, 2 Drawing Sheets

DEVICE TO COLLECT CUTTINGS PRODUCED BY A CUTTING TOOL

This invention was made with Government support under contract number F33657-02-C-2001 awarded by the United States Air Force. The government has certain rights in this invention.

BACKGROUND OF THE INVENTION

The present invention relates to cutting or drilling devices and methods of manufacturing and more particularly to a device to collect cuttings produced by a cutting tool, drill bit or the like.

In cutting or drilling operations, debris or cuttings are produced when material is removed from a workpiece by the cutting tool or drill bit. In cutting some materials, such as a metal or the like, these cuttings can be in the form of elongated spirals of material that can have extremely sharp edges. In some manufacturing or other processes, collecting such cuttings is highly desirable to prevent the cuttings from falling into areas where they could cause damage or injury. In the aerospace industry, for example, such cuttings may be referred to as foreign object debris which if not collected or later removed could result in damage to other components of an aerospace vehicle or the like.

For effective and efficient collection or removal of such cuttings, air or gas pressure is used, such as suction or aspirator systems or similar systems. These systems are extremely cumbersome because of the suction or aspirator equipment, necessitating the provision of space in the vicinity of the drilling operation for a motor and pump or fan, and a separate container or bag to collect the cuttings. Additionally, in most instances, the container must be handled separately from the drilling apparatus. Such systems may also utilize bulky hoses to supply air pressure or suction and to carry away the debris. The extra equipment and bulk of such systems may preclude their use in confined spaces in which drilling must be performed, such as in the assembly of aerospace vehicles or the like.

BRIEF SUMMARY OF THE INVENTION

In accordance with an embodiment of the present invention, a device to collect cuttings produced by a cutting tool may include a chip cutter to shear or cut each cutting into a multiplicity of chips, each chip being substantially smaller that the cutting from which the chip came. The device may also include a collector to collect the chips without using suction and other air or gas pressure. The chip cutter may be disposed within the collector.

In accordance with another embodiment of the present invention, a device to collect cuttings produced by a cutting tool may include a bushing through which the cutting tool may extend when the device is in an operative position relative to the cutting tool. The device may also include at least one opening or slot formed in the bushing. Centrifugal force created by rotation of the cutting tool forces each cutting into the at least one opening for shearing or cutting into a multiplicity of chips, each chip being substantially smaller than the cutting from which the chip came. The device may further include a collector disposed about the bushing to collect the chips. The collector may include a contact end to contact a workpiece surface and to enclose the cutting tool and to retain cuttings within the device to be directed to the at least one opening when the device is in contact with the workpiece during a cutting or drilling operation.

In accordance with another embodiment of the present invention, a method of manufacturing a device to collect cutting produced by a cutting tool may include providing a chip cutter to shear each cutting into a multiplicity of chips, each chip being substantially smaller than the cutting from which the chip came. The method may also include providing a collector to collect the chips without using suction and other air or gas pressure. The method may further include disposing the chip cutter within the collector.

In accordance with another embodiment of the present invention, a method of manufacturing may include applying a rotating cutting tool to a workpiece to perform a cutting or drilling operation. The method may also include shearing each cutting produced by the cutting tool into a multiplicity of chips each substantially smaller than the cuttings. The method may further include collecting chips without the use of suction and other air or gas pressure.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
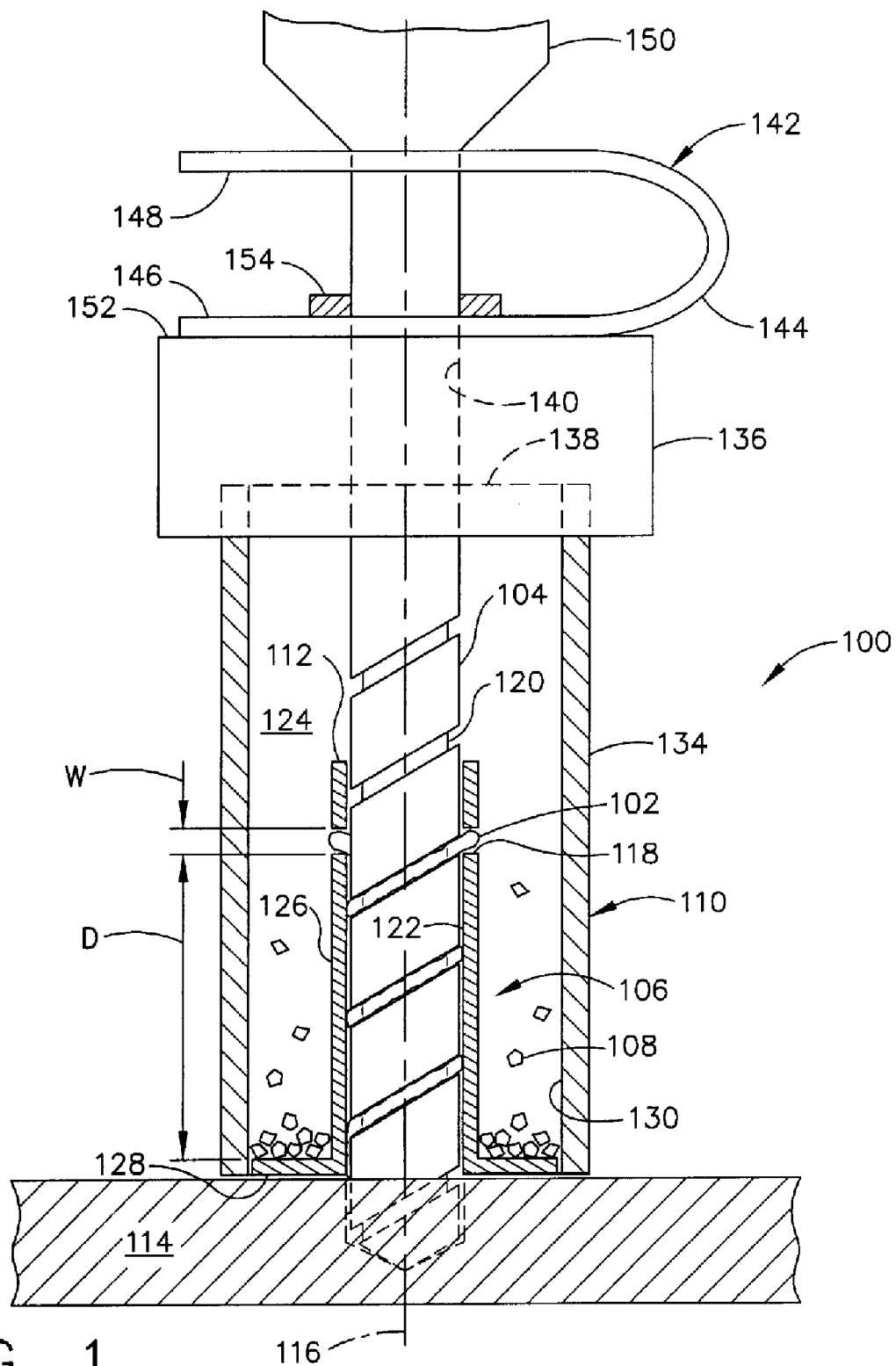
FIG. 1 is a detailed cross-sectional view of a device to collect cuttings produced by a cutting tool in accordance with an embodiment of the present invention.

FIG. 1 is a detailed cross-sectional view of a device 100 to collect cuttings 102 produced by a cutting tool 104, drill bit or the like in accordance with an embodiment of the present invention. The device 100 may include a chip cutter 106 to shear or cut each cutting into a multiplicity of chips 108, each chip 108 being substantially smaller than the cutting 102 from which the chip 108 came. The device 100 may also include a collector 110 to collect the chips 108 without using suction or other air or gas pressure as described in more detail below. The chip cutter 106 is disposed within the collector 110. The cuttings 102 are sheared into substantially smaller chips 108 than the cuttings 102 to facilitate collection of a significant number of chips 108 before the collector 110 needs to be emptied. This permits a considerable number of cutting or drilling operations to be performed or a significant amount of material to be drilled before the collector 110 requires emptying.

The chip cutter 106 may include a bushing 112 through which the cutting tool 104 may extend to a workpiece 114 when the device 100 is in an operative position relative to the cutting tool 104 as illustrated in FIG. 1. The bushing 112 may substantially maintain a lateral position of the device 100 relative to an axis of rotation (illustrated by the dotted and dashed line 116) of the cutting tool 104. The bushing 112 may also permit the cutting tool 104 to move relative to the device 100 along the axis 116 of rotation of the cutting tool 104. This permits the device 100 and bushing 112 to ride or move along the extent of the cutting tool 104 as the cutting tool 104 drills or cuts into the workpiece 114.

A one or more openings 118 or slots may be formed at a predetermined location in the chip cutter 106 or bushing 112. A centrifugal force created by rotation of the cutting tool 104 will force each cutting 102 into the device 100. The spiral cutting 102 will be directed along the cutting tool 104 being retained within a flute 120 of the cutting tool 104 by an interior wall 122 of the bushing 112. When the cutting 102 reaches the opening 118, the centrifugal force will then direct the cutting 104 into the opening 118. The opening 118 will then shear the cutting 102 into the multiplicity of chips 108. The centrifugal force will further urge each chip 108 into an interior 124 of the collector 110.

The bushing 112 may include a substantially elongated portion 126 that may contact or ride against the cutting tool 104. The bushing 112 may also include a base or contact portion 128 to contact an interior wall 130 of the collector 110. The base or contact portion 128 may be substantially orthogonal to the elongated portion 126 of the bushing 112. The base or contact portion 128 may form a seal to retain the chips 108 within the interior 124 of the collector 110.

The at least one opening 118 or slot may be formed in the elongated portion 126 of the bushing 112 at a selected distance "D" from the base portion 128 to receive the cuttings 102, shear the cuttings into the smaller chips 108 and pass the chips 108 into the interior 124 of the collector 110. The opening 118 or slot may be substantially elliptical or rectangular with a selected width "W" and length (not shown). The longer dimension of the opening 118 may extend in a circumferential direction in the bushing 112 or may extend in an axial direction. The dimensions of the opening 118 may be dependent upon the size of the cutting tool 104 and flutes 120, so that the size of the possible cuttings 102 resulting from a cutting operation may be able to enter the opening 118 for shearing into the chips 108. The present invention is not intended to be limited by the shape or size of the opening 118.

The collector 110 may include a collection tube 134 to hold the chips 108. The collection tube 134 may be substantially transparent to facilitate determination of when the collection tube 134 is substantially full of chips 108 and needs to be emptied. The collector 110 may also include an end cap 136. The end cap 136 may releasably seal an end 138 of the collection tube 134 opposite to the bushing 112 to retain the chips 108 within the collection tube 134. The end cap 136 is removable to empty the chips 108 from the collection tube 134. A hole 140 may be formed in the end cap 136 to receive the cutting tool 104 when the device 100 is placed in an operating position with the cutting tool 104 inserted into and extending through the device 100. The end cap 136 may be made from a resilient material, such as a polypropylene or other flexible rubber type material, to permit the end cap assembly 136 to be used with a range of different sized collector tubes 134. The collector tube 134 may also be configured to accept different sizes of bushings 112 as may be needed for different sizes of cutting tools 104. Accordingly, one collector tube 134 and end cap assembly 136 may accommodate various sizes of bushings 112 and therefore a variety of cutting tools 104.

The device 100 may further include a biasing element 142 to urge the device 100 to maintain contact with the workpiece 114 during a cutting or drilling operation to direct the cuttings into the device 100. The biasing element 142 may include a strap spring 144. The strap spring 144 may be a elongated strip of resilient material, such as a plastic or a metal, that may be folded into substantially a U-shape but will return to a flat or straight orientation if not held in the substantially U-shape.

One end 146 of the strap spring 144 may be attached to the end cap 136 or to the collector 110 and a distal end 148 may contact a chuck 150 which holds the cutting tool 104. The strap spring 144 may contact any structure that will facilitate forming the U-shape and bias the device 100 to maintain contact with the workpiece 114 during a cutting or drilling operation. The spring strap 144 may be attached to a top surface 152 of the end cap 136. The spring strap 144 may be attached by an adhesive or other means. A hole (not shown in FIG. 1 for purposes of clarity) may be formed in the spring strap 144 in alignment with the end cap hole 140 to receive the cutting tool 104. A grommet 154 or the like may be provided to attach the spring strap 144 to the end cap 136 and to facilitate alignment of the device 100 on the cutting tool 104.

Figure 2:
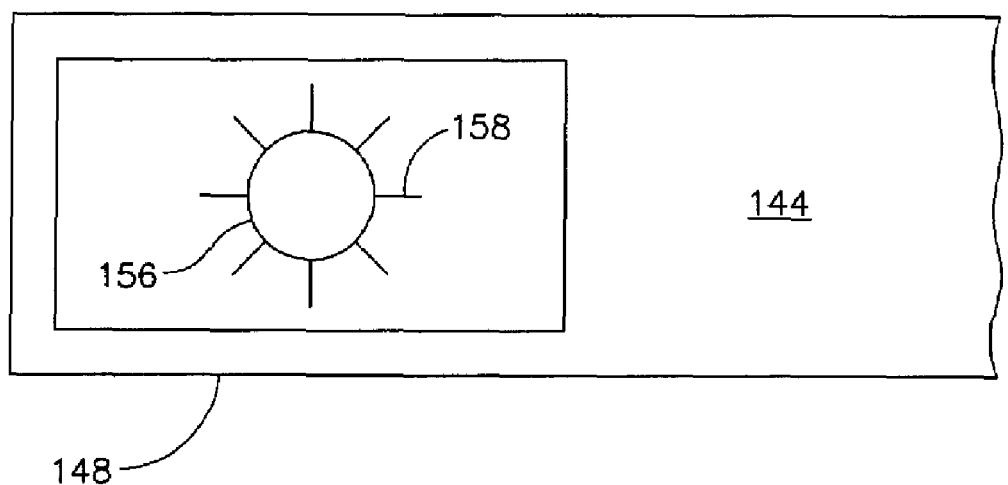
FIG. 2 is a detailed top view of a biasing element of the device of FIG. 1 in accordance with an embodiment of the present invention.

The distal end 148 of the spring strap 144 may also have a hole 156 formed therein as shown in FIG. 2. FIG. 2 is a detailed top view of the biasing element 142 of the device 100 of FIG. 1 in accordance with an embodiment of the present invention. The hole 156 may include a structure to resiliently receive different sizes of cutting tools and to hold the device in position relative to each different sized cutting tool. The structure to resiliently receive different sizes of cutting tools may include a plurality of slits 158 cut radially outward from the hole 156. The spring strap 144 attached in this manner may also serve to retain the end cap 136 when the collector and chips cutter assembly or device 100 is removed to empty the collector 110. The spring strap 144 and end cap 136 may then remain attached to the cutting 104 when the collection tube 134 is removed to dispose of chips 108. The biasing element 142 or spring strap 144 may also define a drill stop.

Under some circumstances, the structure of the present invention may permit a smaller cutting tool 104 to be used with a larger bushing 112 than normal, such as in overhead use or drilling on a vertical surface. The device 100 may be retained in place relative to the cutting tool 104 by the biasing element 142 and slits 158 formed in the spring strap 144.

In another embodiment of the present invention, the strap spring 144 may be replaced by a coil spring disposed between the end cap 136 and the chuck 150.

In operation, the device 100 may be used in a method of manufacturing, such as manufacturing aerospace products, vehicles or the like, where collection of cuttings in important. The method may include applying a rotating cutting tool, such as cutting tool 104 of FIG. 1, to a workpiece 114 to perform a cutting or drilling operation. The method may also include shearing or cutting each cutting 102 produced by the cutting tool 104 into a multiplicity of chips 108 which are each substantially smaller than the cuttings 102. The method may further include collecting the chips in a collector, such as collection tube 134 without the use of suction and other air or gas pressure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A device to collect cuttings produced by a cutting tool, comprising:
    a chip cutter to shear each cutting into a multiplicity of chips each substantially smaller than each cutting, wherein the chip cutter includes a bushing through which the cutting tool extends when the device is in an operative position relative to the cutting tool to substantially maintain a lateral position of the device relative to an axis of rotation of the cutting tool and to permit the cutting tool to move relative to the device along the axis of rotation of the cutting tool;
    a collector to collect the chips without using suction and other air or gas pressure, wherein the chip cutter is disposed within the collector, the bushing including an elongated portion and a base portion extending orthogonally from the elongated portion, the base portion forming a seal with the collector to retain chips within an interior of the collector and being in direct contact with the workpiece, the cutting tool contacting or riding against the elongated portion of the bushing within the collector; and
    an opening formed in the elongated portion to shear each cutting into the multiplicity of chips, wherein the opening is substantially elliptical or rectangular with a selected width and length throughout the extent of the opening.

2. The device of claim 1, further comprising at least one opening formed in the chip cutter, wherein a centrifugal force created by rotation of the cutting tool forces each cutting into the at least one opening for shearing into the chips to be collected by the collector.

3. The device of claim 2, further comprising an interior wall to retain and direct the cuttings to the at least one opening in the chip cutter when the device is in contact with a workpiece during a cutting or drilling operation.

4. The device of claim 1, further comprising at least one opening formed at a predetermined location in the bushing, wherein a centrifugal force created by rotation of the cutting tool forces each cutting into the at least one open for shearing into the multiplicity of chips and wherein the centrifugal force further urges each chip into an interior of the collector.

5. The device of claim 4, wherein the bushing comprises an interior wall that retains cuttings within the device to be directed to the at least one opening in the bushing when the device is in contact with a workpiece during a cutting or drilling operation.

6. The device of claim 1, wherein the collector comprises:
    a collection tube;
    an end cap, wherein the bushing contacts the collection tube proximate to one end thereof and the end cap releasably seals an end of the collection tube opposite to the bushing to retain the chips within the collection tube and wherein the end cap is removable to empty chips from the collection tube; and
    a hole formed in the end cap to receive the cutting tool.

7. The device of claim 6, further comprising a biasing element to urge the device to maintain contact with a workpiece during a cutting or drilling operation to direct the cuttings into the device.

8. The device of claim 7, wherein the biasing element comprises a strap spring including one end attached to the end cap and a distal end to contact a chuck for holding the cutting tool, wherein the strap spring urges the device away from the chuck as the cutting tool moves in a direction along its axis of rotation within the device and wherein the strap spring is adapted to attach the end cap to the cutting tool and to retain the end cap attached to the cutting tool when the collection tube is removed to empty chips.

9. The device of claim 8, further comprising a hole formed in the strap spring proximate to the distal end, wherein the hole includes a structure to resiliently receive each of a plurality of different sizes of cutting tools and to hold the device in position relative to each cutting tool.

10. The device of claim 6, wherein the collection tube is substantially transparent to facilitate determination of when the collection tube is substantially full of chips and needs to be emptied.

11. A device to collect cuttings produced by a cutting tool, comprising:
    a bushing through which the cutting tool extends when the device is in an operative position relative to the cutting tool;
    at least one opening formed in the bushing, wherein centrifugal force created by rotation of the cutting tool forces each cutting into the at least one opening for shearing into a multiplicity of chips each substantially smaller than each cutting, wherein the opening is substantially elliptical or rectangular with a selected width and length throughout the extent of the opening; and
    a collector disposed about the bushing to collect the chips, the bushing including an elongated portion and a base portion extending orthogonally from the elongated portion, the base portion forming a seal with the collector to retain chips within an interior of the collector and being in direct contact with the workpiece, and the cutting tool contacting or riding against the elongated portion of the bushing within the collector.

12. The device of claim 11, wherein the collector comprises:
    a collection tube;
    an end cap, wherein the bushing contacts the collection tube proximate to one end thereof and the end cap releasably seals an end of the collection tube opposite to the bushing to retain the chips within the collection tube and wherein the end cap is removable to empty chips from the collection tube; and
    a hole formed in the end cap to receive the cutting tool.

13. The device of claim 12, further comprising a biasing element to urge the contact end to remain in contact with the workpiece during a cutting or drilling operation to prevent any cuttings from escaping outside of the device.

14. The device of claim 13, wherein the biasing element further comprises a drill stop.

15. A method of manufacturing a device to collect cuttings produced by a cutting tool, comprising:
    providing a chip cutter to shear each cutting into a multiplicity of chips each substantially smaller than each cutting, wherein providing the chip cutter includes providing a bushing through which the cutting tool extends when the device is in an operative position relative to the cutting tool to substantially maintain a lateral position of the device relative to an axis of rotation of the cutting tool and to permit the cutting tool to move relative to the device along the axis of rotation of the cutting tool;
    forming an opening in the bushing to shear each of the cuttings, the opening being substantially elliptical or rectangular with a selected width and length throughout the extent of the opening;

providing a collector to collect the chips without using suction and other air or gas pressure; and disposing the chip cutter within the collector, the bushing including an elongated portion and a base portion extending orthogonally from the elongated portion, the base portion forming a seal with the collector to retain chips within an interior of the collector and being in direct contact with the workpiece, and the cutting tool contacting or riding against the elongated portion of the bushing within the collector.

16. The method of claim 15, further comprising forming at least one opening in the chip cutter, wherein centrifugal force created by rotation of the cutting tool forces each cutting into the at least one opening for shearing into the chips.

17. The method of claim 15, further comprising forming at least one opening at a predetermined location in the bushing, wherein centrifugal force created by rotation of the cutting tool forces each cutting into the at least one open for shearing into the multiplicity of chips and wherein the centrifugal force further deposits each chip into an interior of the collector.

18. The method of claim 15, wherein providing the collector comprises:

providing a collection tube;

providing an end cap, wherein the bushing contacts the collection tube proximate to one end thereof and the end cap releasably seals an end of the collection tube opposite to the bushing to retain the chips within the collection tube and wherein the end cap is removable to empty chips from the collection tube; and forming a hole in the end cap to receive the cutting tool.

19. The method of claim 15, further comprising providing a biasing element to urge the device to maintain contact with the workpiece during a cutting or drilling operation to direct the cuttings into the device.

20. A method of manufacturing, comprising:

applying a rotating cutting tool to a workpiece to perform a cutting or drilling operation; and inserting the cutting tool through a chip collector and a bushing disposed in the chip collector, wherein a centrifugal force created by rotation of the cutting tool forces each cutting produced by the cutting tool into at least one opening formed in the bushing for shearing each cutting into a multiplicity of chips which are deposited in the collector, the bushing including an elongated portion and a base portion extending orthogonally from the elongated portion, the base portion forming a seal with the collector to retain chips within an interior of the collector and being in direct contact with the workpiece and the elongated portion including an opening formed therein to shear each cutting into the multiplicity of chips, wherein the opening is substantially elliptical or rectangular with a selected width and length throughout the extent of the opening, and the cutting tool contacting or riding against the elongated portion of the bushing within the collector.

21. The method of claim 20, further comprising collecting the chips in a collection tube, wherein the chip cutter is disposed in the collection tube.

22. The method of claim 21, further comprising:

positioning a device including the chip cutter and the collection tube in a operative position relative to the cutting tool; and biasing the device to urge the device to maintain contact between an open end of the device and the workpiece and to substantially enclose the cutting tool to prevent cuttings from escaping outside of the device during a cutting or drilling operation.

23. The method of claim 20, further comprising inserting the cutting tool through a strap spring to urge the collector toward the workpiece to receive the cuttings during a cutting or drilling operation, wherein the strap spring includes a structure to resiliently receive each of a plurality of different sizes of cutting tools and to retain an end cap of the chip collector attached to the cutting tool when a collection tube of the chip collector is removed to dispose of chips.

* * * * *